UNITED STATES PATENT OFFICE.

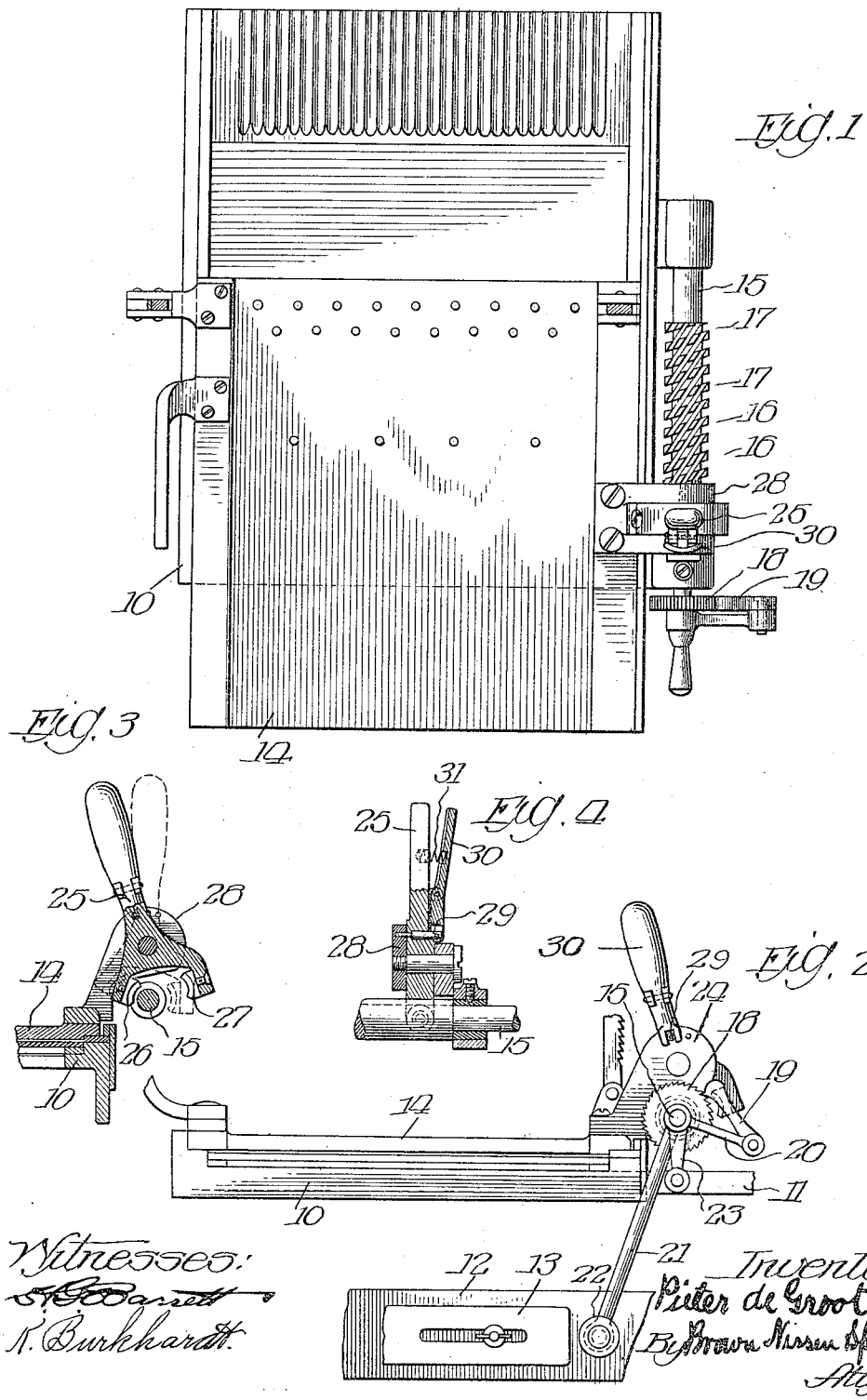

PIETER DE GROOT, OF ROTTERDAM, NETHERLANDS, ASSIGNOR TO U. S. SLICING MACHINE COMPANY, OF CHICAGO, ILLINOIS, A CORPORATION OF ILLINOIS.

FEEDING MECHANISM.

1,193,672. Specification of Letters Patent. Patented Aug. 8, 1916.

Application filed June 26, 1914. Serial No. 847,371.

*To all whom it may concern:*

Be it known that I, PIETER DE GROOT, a subject of the Queen of the Netherlands, residing at Rotterdam, Netherlands, have invented certain new and useful Improvements in Feeding Mechanism, of which the following is a specification.

This invention relates to feeding mechanism and is particularly adapted, though not necessarily limited, to use in connection with slicing machines.

The principal object of the invention is to provide means whereby thick or thin slices may be cut, or a greater variance of intermittent feed produced than is possible with a mechanism in which a single feeding screw is employed.

A further object of the invention is to provide a new and improved feeding mechanism embodying a single screw shaft with a plurality of feeding screws thereon.

For the attainment of these ends and the accomplishment of other new and useful objects, as will appear, the invention consists in the features of novelty in the construction, combination and arrangement of the several parts generally shown in the accompanying drawing and described in the specification, but more particularly pointed out in the appended claims.

In the drawings,—Figure 1 is a plan view of part of a meat slicing machine, showing the intermittently advanced support in combination with feeding mechanism constructed in accordance with the principles of this invention; Fig. 2 is a front elevation of the parts shown in Fig. 1; Fig. 3 is a sectional view of a portion of the feeding mechanism, and Fig. 4 is a detail view of the selective means.

In machines of this type, the feeding mechanism previously employed embodied a single feed screw, with which the usual feed, comprising a half nut, coöperated. In this construction the extent of feeding movement and the thickness of the slices cut are determined by the extent of movement of the feeding member, or the degree of rotation of the feeding screw, thereby rendering it impossible to cut a slice of greater thickness than the extent of feeding movement imparted by the rotation of the single feed screw. By providing the feed shaft with a plurality of screw threads, this difficulty is overcome, and it is only necessary to provide a selecting device with different half nuts which engage only the screw threads for which they are intended, in order to effect as great an extent of movement as is desired by the rotation of the feed shaft.

In the present invention, the numeral 10 designates an ordinary reciprocating carriage movable upon the guide 11, and the numeral 12 designates a fixed portion of the machine having an adjustable abutment 13 connected therewith. A meat-supporting table or holder 14 is adapted to be moved backwardly and forwardly upon the carriage 10 to intermittently advance the article to be sliced. A rotatable feed shaft 15 is disposed adjacent the support 14 and is provided with screw threads 16 and 17 both extending in the same direction about the shaft, and one being of considerably greater pitch than the other, so that the threads of one screw must be cut transversely to form the threads of the other screw. Both of these screws are adapted to advance the support or holder 14, only one of them being used at a time. The shaft 15 may be rotated by means of a ratchet wheel 18 and a pawl 19, the pawl being pivotally connected to an arm 20 formed with an extension 21, and the extension being provided with an anti-friction roller 22 adapted to be engaged by the abutment 13. When the carriage 10 is reciprocated, the arm carrying the pawl 19 will be actuated and the pawl will impart rotation to the ratchet wheel 18, which is connected to the shaft 15. A handle 23 may also be provided in connection with the shaft 15, so as to quickly and readily position the support 14 by rotating the handle.

A bracket 24 is connected to or formed integral with the support 14, and pivotally mounted in the bracket is a lever 25 formed with a forked end which extends over the shaft 15 and carries half nuts 26 and 27, adapted to mesh one with the thread 16 and the other with the thread 17 on the shaft 15. This lever 25 may be moved so that the corresponding half nut engages with either thread 16 or 17, or it may be moved to any intermediate position, as shown in dotted outline in Fig. 3, in which neither of the threads is engaged.

In order to hold the shifting or selecting lever 25 in any desired position, a plate 28 is secured to the support 14, with perforations corresponding to the three positions of the selecting lever 25. Extending through the selecting lever is a locking pin 29, which is adapted to engage in the perforations of the plate 28. A locking lever 30 is pivoted to the selecting lever 25 and to this the locking pin is connected, so that by moving the lever 30 against the pressure of a spring 31, inserted between it and the lever 25, the locking pin may be withdrawn from one perforation in the plate 28, and the lever 25 may be moved to any other position, whereupon the pin 29 will again enter one of the perforations to hold the selecting lever 25 in the selected position.

In the feeding operation, with the half nut 26 in contact with one of the screw threads 16, the engagement of the abutment 13 with the anti-friction roller 22 will cause the pawl 19 to engage the ratchet wheel 18 to effect the rotation of the shaft and the advance of the table or support 14, the position of the abutment 13 determining the extent of rotation of the shaft 15. If it is desired to advance the support 14 to a greater extent than is possible with the thread 16, the selecting lever 25 is shifted so that the other half nut 27 is engaged with the other thread 17, after which the support 14 will be advanced by the rotation of the shaft 15.

What I claim is:

1. Feeding mechanism, embodying a rotatable shaft with screws of different pitch, a shiftable element coöperating with the shaft and movable into operative engagement with one of the screws and out of operative engagement with the other, a movable member with which the shaft element is connected, the said screws being both operative to advance the member and feed the shiftable element in the same direction and in a direction lengthwise of the axis of the rotatable shaft, and means for rotating the shaft and screws.

2. Feeding mechanism, embodying a plurality of rotatable feeding screws, a shiftable element coöperating therewith and movable into operative relation with one and out of operative relation with the other, a movable member with which the said shiftable element is connected, and means for causing a relative movement between the said shiftable element and the respective feeding screws to advance the member, both of said feeding screws causing the movement of the member in the same direction, and operating to feed the said shiftable element in a direction lengthwise of the axis of the feeding screws.

3. Feeding mechanism, embracing rotatable feeding screws, a shiftable element coöperating therewith and movable into operative connection with one and out of operative connection with the other, means for maintaining the shiftable element in its shifted position, a movable member with which the said shiftable element is connected, and means for causing a relative movement between the said shiftable element and the respective feeding screws to advance the member, both of said feeding screws causing the movement of the member in the same direction, and operating to feed the said shiftable element in a direction lengthwise of the axis of the feeding screws.

4. Feeding mechanism, embodying a plurality of rotatable feeding screws, a shiftable element coöperating therewith and moving into operative relation with one and out of operative relation with the other, a movable member with which said shiftable element is connected, and means for causing a relative movement between the said shiftable element and the respective feeding screws to intermittently advance the member, both of said feeding screws causing the movement of the member in the same direction, and operating to feed the shiftable element in a direction lengthwise of the axis of the feeding screws, and one of said feeding screws adapted to impart a greater extent of movement to the member upon each movement of the latter, than the other of said feeding elements.

5. Feeding mechanism, embodying a plurality of feed screws, the thread of one being arranged at a different pitch from the thread of the other, a shiftable element movable into operative relation with one and out of operative relation with the other, said shiftable element having portions coöperating with the thread of the respective screws, a movable member with which the shiftable element is connected, and provisions for rotating the screws, both screws operative to feed the member in the same direction.

6. Feeding mechanism, embodying a plurality of feeding elements, a movable member adapted to be intermittently advanced in the same direction by each of the elements, one of the elements adapted to impart a greater extent of movement to the member upon each rotation thereof than the other, selective means for the feeding elements, and means for causing the advancement of the member by the selecting element.

7. Feeding mechanism, embodying a movable member, a plurality of rotatable feed screws, the pitch of the thread of one screw being different from the pitch of the thread of the other screw, and provisions whereby the screws will individually and intermittently advance the member in the same direction, the said provisions embodying selecting mechanism for the screws.

8. Feeding mechanism, embodying a plurality of rotatable feed screws, the pitch of the thread of one screw differing from the pitch of the thread of the other screw, a member adapted for intermittent advancement by each of the screws, and selecting mechanism for the screws, the selecting mechanism embodying a shiftable nut element, the latter having a portion adapted to coöperate with each screw.

9. Feeding mechanism, embodying rotatable feed screws, the pitch of the thread of one screw differing from the pitch of the thread of the other screw, a member adapted for intermittent advancement by each of the screws, selecting mechanism for the screws, the selecting mechanism having a shiftable nut element, the latter having a portion adapted to coöperate with each screw, and means for maintaining the nut element in its shifted position.

10. Feeding mechanism, embodying rotatable feed screws, the pitch of the thread of one screw differing from the pitch of the thread of the other screw, a member adapted for intermittent advancement by each of the screws, and selecting mechanism for the screws, the selecting mechanism embodying a double half nut movable into operative relation with one of the feed screws and out of operative relation with the other screw.

11. Feeding mechanism, embodying a member, a plurality of rotatable driving screws each adapted to impart to the member an intermittent advancing movement in the same direction, the extent of each movement of the member effected by one of the driving screws differing from the same movement of the other driving screw, and a driven element operatively connected with said member and shiftable from one to the other of said driving screws, said driving elements feeding the driven element in a direction lengthwise of the axis of the former.

12. Feeding mechanism, embodying a member, a plurality of rotatable driving screws each adapted to impart to the member an intermittent advancing movement in the same direction, the extent of movement of the member by one of the screws differing from the same movement of the other driving screw, and provisions for rendering one or the other of the driving screws active at will with respect to the said member, said member moving in a direction lengthwise of the axis of the driving element.

13. Feeding mechanism, comprising a rotatable shaft provided with screw threads of different pitch, and a movable member adapted to be intermittently advanced in the same direction by each of said screws, one of which imparts a greater movement to the member upon each rotation thereof than the other.

14. Feeding mechanism, comprising a rotatable shaft with screw threads thereon of different pitch, a movable member adapted to be intermittently advanced by each of said screws, and selective means for connecting the member with one of the feeding screw threads.

15. Feeding mechanism, comprising a rotatable member with screw threads of different pitch extending in the same direction, a movable member adapted to be intermittently advanced in the same direction by each of the threads, means for engaging either one or neither of the screw threads, and a connection between the said means and the member for causing the advancement of the member by the means.

16. Feeding mechanism, comprising a shaft with a plurality of feed screws of different pitch, a movable member, and selective means connected to the member for engaging any one of the screws to advance the member in the same direction.

17. Feeding mechanism, comprising a rotatable shaft, with continuous screw threads extending in the same direction and of different pitch, a movable member, and selective means for engaging any one of said continuous threads connected to said member and adapted to cause the advancement of the member by the rotation of the shaft.

18. Feeding mechanism, comprising a rotatable shaft with continuous screw threads of different pitch extending in the same direction, a movable member, selective means movable out of engagement with or to engage any one of the screws connected to the member adapted to advance the member by the rotation of the shaft, and locking means to hold the selective means in any selected position.

19. Feeding mechanism embodying a plurality of helical feeding portions, a movable member adapted to be advanced in the same direction by each of the said portions, one of the said portions adapted to impart a greater extent of movement to the member upon each rotation thereof than the other, selective means for the said feeding portions, and means for causing the advancement of the member by the selecting means.

20. Feeding mechanism embodying a member movable in a fixed plane, and mechanism for feeding said member at different rates of speed in the same direction, said mechanism comprising a nut to which the said member is operatively connected, and means provided with different surfaces adapted to be alternately engaged by said nut.

21. Feeding mechanism embodying a member movable in a fixed plane, and mechanism for feeding said member at different rates of speed in the same direction, said mechanism comprising a nut to which the said member is operatively connected, and means provided with threads of different pitch adapted to be engaged by the nut.

22. Feeding mechanism embodying a member movable in a fixed plane, and mechanism for feeding said member at different rates of speed in the same direction, said mechanism comprising a nut to which the said member is operatively connected, means provided with threads of different pitch adapted to be engaged by the nut, and means for rotating the last said means.

In testimony whereof I have signed my name to this specification, in the presence of two subscribing witnesses, on this ninth day of June A. D. 1914.

PIETER DE GROOT.

Witnesses:
WILHELMUS A. VAN BERKEL,
HENDRIK VAN DER RU.

Copies of this patent may be obtained for five cents each, by addressing the "Commissioner of Patents, Washington, D. C."